(12) United States Patent
Mullender et al.

(10) Patent No.: US 10,798,187 B2
(45) Date of Patent: Oct. 6, 2020

(54) SECURE SERVICE CHAINING (71) Applicant: CISCO TECHNOLOGY, INC., San Jose, CA (US)

(72) Inventors: Sape Jurriën Mullender, Amsterdam (NL); Hendrikus G. P. Bosch, Aalsmeer (NL); Alessandro Duminuco, Milan (IT); Jeffrey Napper, CL Delft (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 279 days.

(21) Appl. No.: 15/627,084

(22) Filed: Jun. 19, 2017

(65) Prior Publication Data

US 2018/0367621 A1 Dec. 20, 2018

(51) Int. Cl.
*H04L 29/08* (2006.01)
*H04L 29/06* (2006.01)

(52) U.S. Cl.
CPC ............ *H04L 67/16* (2013.01); *H04L 63/123* (2013.01); *H04L 67/02* (2013.01); *H04L 67/2814* (2013.01); *H04L 67/327* (2013.01); *H04L 63/0272* (2013.01); *H04L 63/0823* (2013.01); *H04L 63/168* (2013.01)

(58) Field of Classification Search
CPC ....................................................... H04L 67/16
USPC ........................................................ 709/223
See application file for complete search history.

(56) References Cited

U.S. PATENT DOCUMENTS

| | | | |
|---|---|---|---|
| 3,629,512 A | 12/1971 | Yuan | |
| 4,769,811 A | 9/1988 | Eckberg, Jr. et al. | |
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |

(Continued)

FOREIGN PATENT DOCUMENTS

| | | |
|---|---|---|
| CN | 103716123 | 4/2014 |
| CN | 103716137 | 4/2014 |

(Continued)

OTHER PUBLICATIONS

Matloff, "Level 2 Routing: LAN Bridges and Switches", 2001 (Year: 2001).*

(Continued)

*Primary Examiner* — Ondrej C Vostal
(74) *Attorney, Agent, or Firm* — Polsinelli PC (57) ABSTRACT

In one embodiment, secure service chaining can be implemented efficiently for content delivery systems. An orchestrator can determine a service chain for processing a request from a client for content. The orchestrator can determine a capability identifying nodes of the service chain. The orchestrator can then transmit, to the client, a redirect message having the capability, wherein the redirect message redirects the request to a first node of the service chain. The nodes of the service chain can verify the capability and carry out the service chain. Service functions can be applied to the traffic flow associated with delivering the content to the user.

18 Claims, 7 Drawing Sheets

(56) References Cited

U.S. PATENT DOCUMENTS

| | | |
|---|---|---|
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0128982 A1* | 9/2002 | Gefwert .......... G06Q 20/02 705/67 |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0188019 A1* | 10/2003 | Wesley .......... H04L 29/06 709/245 |

(56) References Cited

U.S. PATENT DOCUMENTS

| | | |
|---|---|---|
| 2003/0214913 A1 | 11/2003 | Kan et al. |
| 2003/0226142 A1 | 12/2003 | Rand |
| 2004/0049579 A1* | 3/2004 | Ims .................... H04L 67/2823 709/225 |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0138065 A1* | 6/2005 | Ciriza .................... G06Q 10/10 |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1* | 7/2008 | Quinn .................... G06F 9/5055 709/238 |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0289039 A1* | 11/2008 | Rits .................... H04L 63/123 726/22 |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0164995 A1* | 6/2009 | Waris .................... G06F 9/5055 718/100 |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2010/0235394 A1* | 9/2010 | Sukanen ............. G06F 16/9537 707/782 |
| 2010/0306368 A1* | 12/2010 | Gagliardi ............. G06F 16/951 709/224 |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0173018 A1* | 6/2014 | Westphal ............. H04L 45/123 709/213 |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0310375 A1* | 10/2014 | Jeon .................... H04L 67/2814 709/217 |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0172380 A1* | 6/2015 | Yamamura .......... G06F 16/9574 709/212 |
| 2015/0180725 A1 | 6/2015 | Varney et al. |
| 2015/0180767 A1* | 6/2015 | Tam .................... H04L 47/10 370/389 |
| 2015/0181309 A1 | 6/2015 | Shepherd et al. |
| 2015/0188949 A1 | 7/2015 | Mahaffey et al. |

(56) References Cited

U.S. PATENT DOCUMENTS

| | | |
|---|---|---|
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0317169 A1* | 11/2015 | Sinha ............. H04L 49/254 713/2 |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0358235 A1* | 12/2015 | Zhang ............. H04L 45/745 370/230 |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0212277 A1* | 7/2016 | Lopez ............. H04M 15/835 |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0285961 A1* | 9/2016 | Kisel ............. H04L 67/327 |
| 2016/0323165 A1 | 11/2016 | Boucadair et al. |
| 2016/0352614 A1* | 12/2016 | Valencia Lopez .... H04L 45/021 |
| 2016/0352629 A1 | 12/2016 | Wang et al. |
| 2016/0380966 A1 | 12/2016 | Gunnalan et al. |
| 2017/0019303 A1 | 1/2017 | Swanny et al. |
| 2017/0019331 A1* | 1/2017 | Yong ............. H04L 45/64 |
| 2017/0031804 A1 | 2/2017 | Ciszewski et al. |
| 2017/0078175 A1 | 3/2017 | Xu et al. |
| 2017/0163742 A1* | 6/2017 | Chou ............. H04L 41/5012 |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0317932 A1* | 11/2017 | Paramasivam ....... H04L 47/125 |
| 2017/0331741 A1 | 11/2017 | Fedyk et al. |
| 2017/0339130 A1* | 11/2017 | Reddy ............. H04L 63/0823 |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |
| 2018/0062997 A1* | 3/2018 | Uberoy ............. H04L 45/745 |
| 2018/0285009 A1* | 10/2018 | Guim Bernat ........ G06F 3/0604 |
| 2018/0359337 A1* | 12/2018 | Kodaypak ............. H04L 67/18 |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Aldrin, S., et al. "Service Function Chaining Operation, Administration and Maintenance Framework," Internet Engineering Task Force, Oct. 26, 2014, 13 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oidid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Part- (56) References Cited

OTHER PUBLICATIONS nership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Baird, Andrew, et al. "AWS Serverless Multi-Tier Architectures; Using Amazon API Gateway and AWS Lambda," Amazon Web Services Inc., Nov. 2015, 20 pages.
Boucadair, Mohamed, et al., "Differentiated Service Function Chaining Framework," Network Working Group Internet Draft draft-boucadair-network-function-chaining-03, Aug. 21, 2013, 21 pages.
Cisco Systems, Inc. "Cisco NSH Service Chaining Configuration Guide," Jul. 28, 2017, 11 pages.
Ersue, Mehmet, "ETSI NFV Management and Orchestration—An Overview," Presentation at the IETF# 88 Meeting, Nov. 3, 2013, 14 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.
Jiang, Yuanlong, et al., "Fault Management in Service Function Chaining," Network Working Group, China Telecom, Oct. 16, 2015, 13 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Alizadeh, Mohammad, et al., "CONGA: Distributed Congestion-Aware Load Balancing for Datacenters," SIGCOMM '14, Aug. 17-22, 2014, 12 pages.
Author Unknown, "IEEE Standard for the Functional Architecture of Next Generation Service Overlay Networks, IEEE Std. 1903-2011," IEEE, Piscataway, NJ, Oct. 7, 2011; 147 pages.
Author Unknown, "OpenNebula 4.6 User Guide," Jun. 12, 2014, opennebula.org, 87 pages.
Author Unknown, "Service-Aware Network Architecture Based on SDN, NFV, and Network Intelligence," 2014, 8 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Bremler-Barr, Anat, et al., "Deep Packet Inspection as a Service," CoNEXT '14, Dec. 2-5, 2014, pp. 271-282.
Cisco Systems, Inc. "Cisco VN-Link: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Farrel, A., et al., "A Path Computation Element (PCE)—Based Architecture," RFC 4655, Network Working Group, Aug. 2006, 40 pages.
Jiang, Y., et al., "An Architecture of Service Function Chaining," IETF Network Working Group Internet Draft, draft-jiang-sfc-arch-01.txt, Feb. 14, 2014; 12 pages.
Katsikas, Goergios P., et al., "Profiling and accelerating commodity NFV service chains with SCC," The Journal of Systems and Software, vol. 127, Jan. 2017, pp. 12-27.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Quinn, P., et al., "Network Service Header," Network Working Group, Mar. 24, 2015, 42 pages; https://tools.ietf.org/pdf/draft-ietf-sfc-nsh-00.pdf
Quinn, P., et al., "Network Service Chaining Problem Statement," draft-quinn-nsc-problem-statement-03.txt, Aug. 26, 2013, 18 pages.
Quinn, Paul, et al., "Service Function Chaining: Creating a Service Plane via Network Service Headers," IEEE Computer Society, 2014, pp. 38-44.
Zhang, Ying, et al. "StEERING: A Software-Defined Networking for Inline Service Chaining," IEEE, 2013, IEEE, p. 10 pages.

* cited by examiner

SECURE SERVICE CHAINING

TECHNICAL FIELD

This disclosure relates in general to the field of communications and, more particularly, to secure service chaining using Hypertext Transfer Protocol (HTTP).

BACKGROUND

In computer networking, network administrators are often concerned with how to best route traffic flows from one end point to another end point across a network. When provisioning a route for a traffic flow, administrators may implement policies to ensure that certain service functions are applied to the packet or the traffic flow as it traverses across the network. Service functions can provide security, wide area network (WAN) acceleration, and load balancing. These service functions can be implemented at various points in the network infrastructure, such as the WAN, data center, campus, etc. Network elements providing these service functions are generally referred to as "service nodes."

BRIEF DESCRIPTION OF THE DRAWINGS

To provide a more complete understanding of the disclosure and features and advantages thereof, reference is made to the following description, taken in conjunction with the accompanying FIGURES, wherein like reference numerals represent like parts, in which.

DETAILED DESCRIPTION OF EXAMPLE EMBODIMENTS

Overview

Secure service chaining can be implemented efficiently for content delivery systems. An orchestrator can determine a service chain for processing a request from a client for content. The orchestrator can determine a capability identifying nodes of the service chain. The orchestrator can then transmit, to the client, a redirect message having the capability, wherein the redirect message redirects the request to a first node of the service chain.

The capability can be digitally signed using cryptography for providing security. The nodes of the service chain can verify the capability, i.e., a signature of the capability, and carry out the service chain. Nodes of the service chain can apply service functions to the traffic flow associated with delivering the content to the user, in a manner specified by the capability.

One aspect of the disclosure relates to computer-implemented methods for secure service chaining using HTTP.

In other aspects, systems for implementing the methods described herein are provided. Moreover, a computer program for carrying out the methods described herein, as well as a non-transitory computer-readable storage-medium storing the computer program are provided. A computer program may, for example, be downloaded (updated) to the existing network devices and systems (e.g. to the existing routers, switches, various control nodes and other network elements, etc.) or be stored upon manufacturing of these devices and systems.

In other aspects, apparatuses comprising means for carrying out one or more of the method steps are envisioned by the disclosure.

As will be appreciated by one skilled in the art, aspects of the disclosure, in particular the functionalities related to service chaining using HTTP, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer-readable medium(s) having computer-readable program code embodied, e.g., stored, thereon.

Example Embodiments

Service Chaining and its Challenges

To accommodate agile networking and flexible provisioning of network nodes in the network, service function chains (SFC) can be used to ensure an ordered set of service functions (SF) to be applied to packets and/or frames of a traffic flow. The ability to implement SFCs is referred to as service chaining. SFCs provides a method for deploying SFs in a way that enables dynamic ordering and topological independence of those SFs. A service function chain can define an ordered set of SFs that is applied to packets and/or frames of a traffic flow, where the ordered set of service functions can be selected as a result of classification. The implied order may not be a linear progression as the architecture allows for nodes that copy to more than one branch. The term service chain is often used as shorthand for service function chain.

Figure 1:
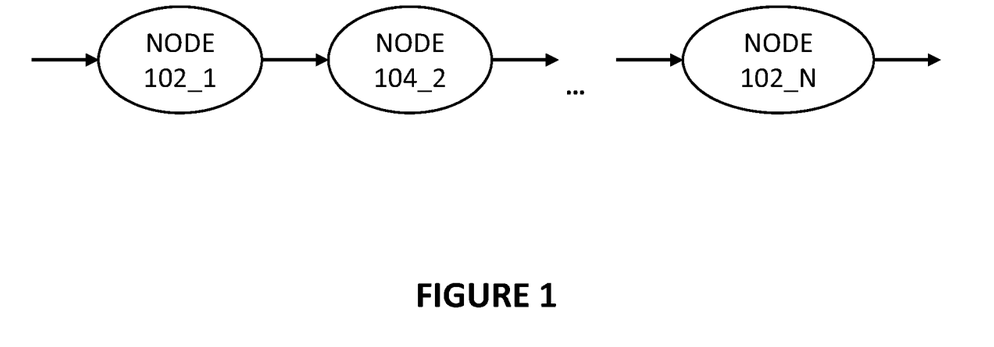
FIG. 1 illustrates a service chain having a plurality of nodes performing respective service functions, according to some embodiments of the disclosure.

FIG. 1 illustrates a service chain having a plurality of service nodes, such as nodes 102_1, 102_2, . . . 102_N. The example here shows N nodes, and N can be two or more. The nodes 102_1, 102_2, . . . 102_N can performing respective service functions, according to some embodiments of the disclosure. At each node, a service function can be applied to the traffic flow, where a given service function can be responsible for specific treatment of received packets. A service function can act at the network layer or other Open Systems Interconnection (OSI) layers (e.g., application layer, presentation layer, session layer, transport layer, data link layer, and physical link layer).

A service function can be a virtual instance or be embedded in a physical network element. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers (SLBs), NAT44, NAT64, HOST_ID injection, HTTP Header Enrichment functions, TCP optimizer, application delivery controllers (ADCs) etc. For some content delivery applications, service functions can include caching, transcoding, advertisement or content modification/insertion, etc.

A service node, such as any one of the nodes 102_1, 102_2, . . . 102_N can be a physical network element (or a virtual element embedded on a physical network element) that hosts one or more SFs and has one or more network locators associated with it for reachability and service delivery. In many standardization documents, "service functions" can refer to the service nodes described herein as having one or more service functions hosted thereon.

Figure 2:
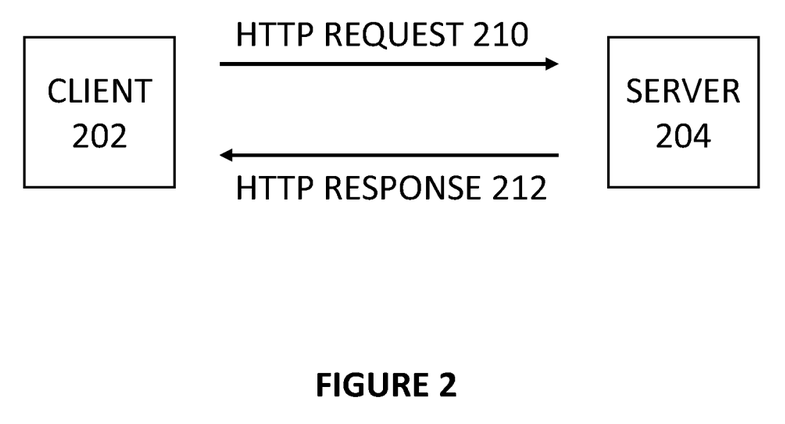
FIG. 2 illustrates an exemplary HTTP request and response.

Generally speaking, service chaining can guide network traffic associated with a client or user entity (e.g., a home computer or a mobile phone) through a series of processing entities, e.g., nodes 102_1, 102_2, . . . 102_N, that perform various service functions on the network traffic. In the field of content delivery, the client consumes content, e.g., audio or video (e.g., from Netflix, YouTube, Spotify, etc.), and the network traffic would transport the audio or video from a content source to the user entity. Typically, the communications protocol of choice for downloading content is Hypertext Transfer Protocol (HTTP) or HTTP Secure (HTTPS). FIG. 2 illustrates an exemplary HTTP request and response. A client 202 can transmit an HTTP request 210 requesting content from server 204. Server 204 can provide the content in an HTTP response 212 to client 202.

Often, the content may have to be processed before delivery to the user. The processing can include: transcoding to overcome bandwidth limitations, insertion of logos, watermarking, augmenting content with metadata, applying digital rights management functionalities, etc. Such content processing can be implemented by nodes in a service chain. In traditional service chaining, the first node of the service chain is responsible for labelling the incoming traffic flow so that the traffic flow follows the rest of the chain. Requiring an "anchor" such as the first node of the service chain to perform such function be burdensome. Moreover, if service chain components, e.g., service nodes, have to perform specific functions for specific flows, there is an additional level of signaling from the service orchestrator to the service nodes. It is a challenge to implement service chaining for content delivery which utilizes HTTP or HTTPS that is efficient and flexible.

Redirect Message to the Client with Capability

To address some of the issues mentioned above, a unique mechanism can be provided to implement and carry out service chaining for content delivery. Specifically, the mechanism utilizes a redirect message (e.g., HTTP redirect message) to cause the client to refer to a start of a service chain. Moreover, the redirect message has a capability, which the client and any one of the nodes in the service chain can use for implementing and/or carrying out the service chain. For a content distribution network that aims to process traffic flows with service chains, the network can cause a client to receive a redirect message that identifies a service chain and its parameters. Advantageously, the redirect mechanism avoids additional overhead otherwise needed for signaling and orchestrating the service chain since the redirect has all the information that the client and the nodes require for implementing and/or carrying out the service chain. Moreover, the capability included in the redirect message can be signed, thereby providing security for the service chain and confining the client to the content that the client is authorized to receive. The following passages elaborates on the details of such mechanism.

For illustration, various examples being described herein consider service chains comprising of one or more nodes (e.g., service functions implemented on service nodes) placed in a data path between a client (e.g., a user entity) and a content producer. For instance, the nodes can perform service functions associated with the content being delivered to the client. These service chains are often confined to a data center. In some cases, these service chains can also apply to clients fetching content from content providers through content delivery networks (CDNs), possibly hierarchies of CDNs (some of which may cache content using service chains). While examples are described with respect to HTTP, it is understood that the examples can be applicable for HTTPS or other similar application level web-based communication protocols used for content delivery. Furthermore, many examples describe a client-server relationship. It is understood that the examples can be applicable to other kinds of relationships where a user entity receives content from a content producer.

Figure 3:
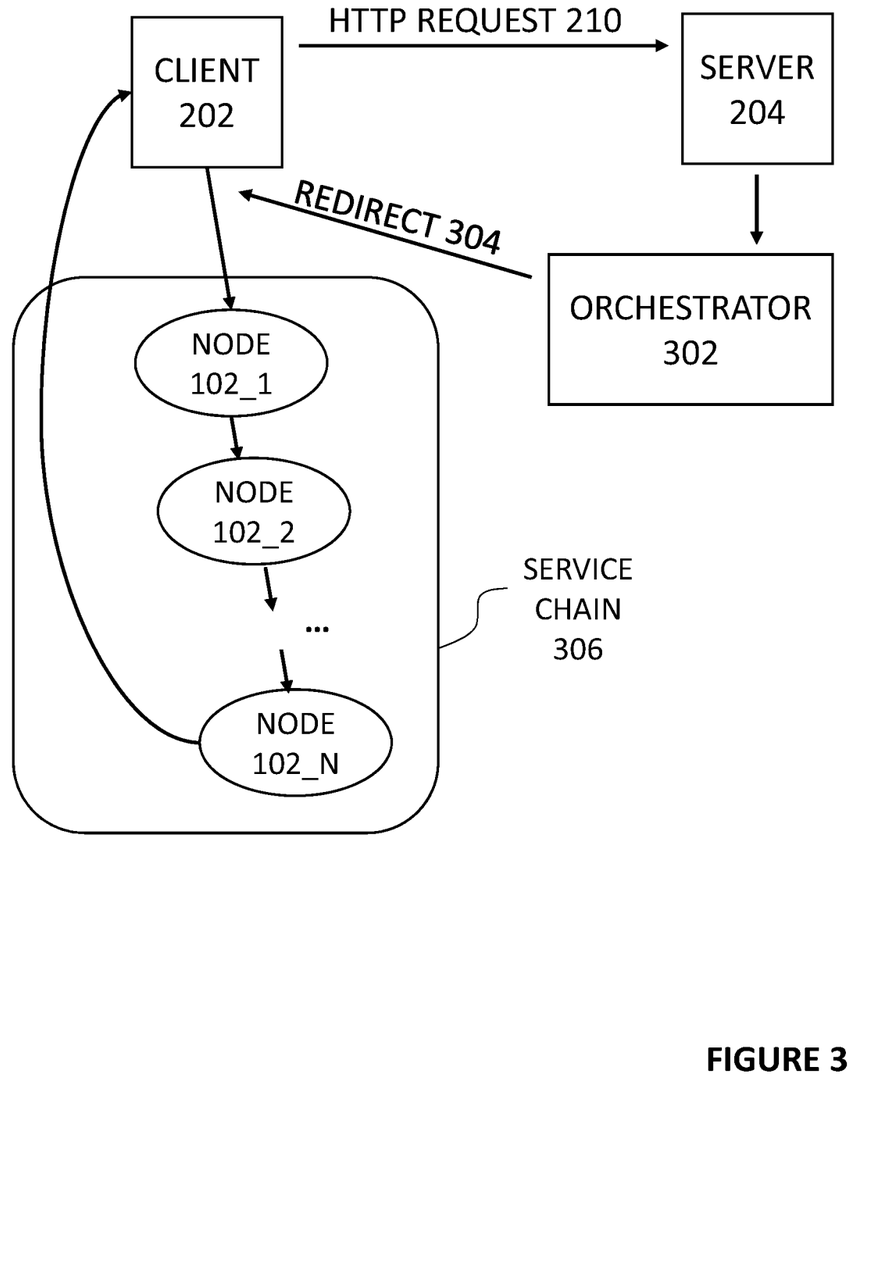
FIG. 3 illustrates an exemplary HTTP request and HTTP redirect response for implementing secure service chaining, according to some embodiments of the disclosure.

FIG. 3 illustrates an exemplary HTTP request and HTTP redirect response for implementing secure service chaining, according to some embodiments of the disclosure. Similar to the mechanism seen in FIG. 2, a client 202 can transmit a HTTP request 210 to server 204 for content. For instance, the HTTP request 210 can request for content to be delivered to client 202. When a client (e.g., user entity) sends the HTTP request 210 specifying server 204, a uniform resource locator in the HTTP request 210 can cause the HTTP request 210 or a derivation thereof to be delivered at an orchestrator 302 for implementing a service chain 306. The orchestrator 302 can decide on the service chain 306 and parameters for the nodes of the service chain 306 (e.g., service chain entities and service functions to be applied by said entities). The service chain 306 having nodes 102_1, 102_2, . . . 102_N is provided as an illustration only, and it is envisioned by the disclosure that other service chains 306 can be implemented. The orchestrator 302 can encode the decided service chain and parameters in a string that is then digitally signed by the orchestrator 302. This signed string constitutes a "capability" or "signed capability", which can identify nodes of the service chain and service functions to be applied on the content. The capability is akin to a theater ticket because the capability is unforgeable (using cryptography), and the capability can be verified and processed by the nodes in the service chain 306. The orchestrator 302 returns a redirect message 304 to the client 202 having the capability. For instance, the redirect message can include a redirect uniform resource locator (URL) which can refer to or redirect the request for content to the start (e.g., first node, e.g., service node 102_1) of the service chain 306 and parameters for carrying out the service chain 306. Each node in the service chain 306 (including the aforementioned first node) can verify the capability for correctness and uses the parameters embedded in it to direct its actions. Service nodes can also uses the capability to construct a URL for forwarding the traffic flow to the next node in the service chain.

Figure 4:
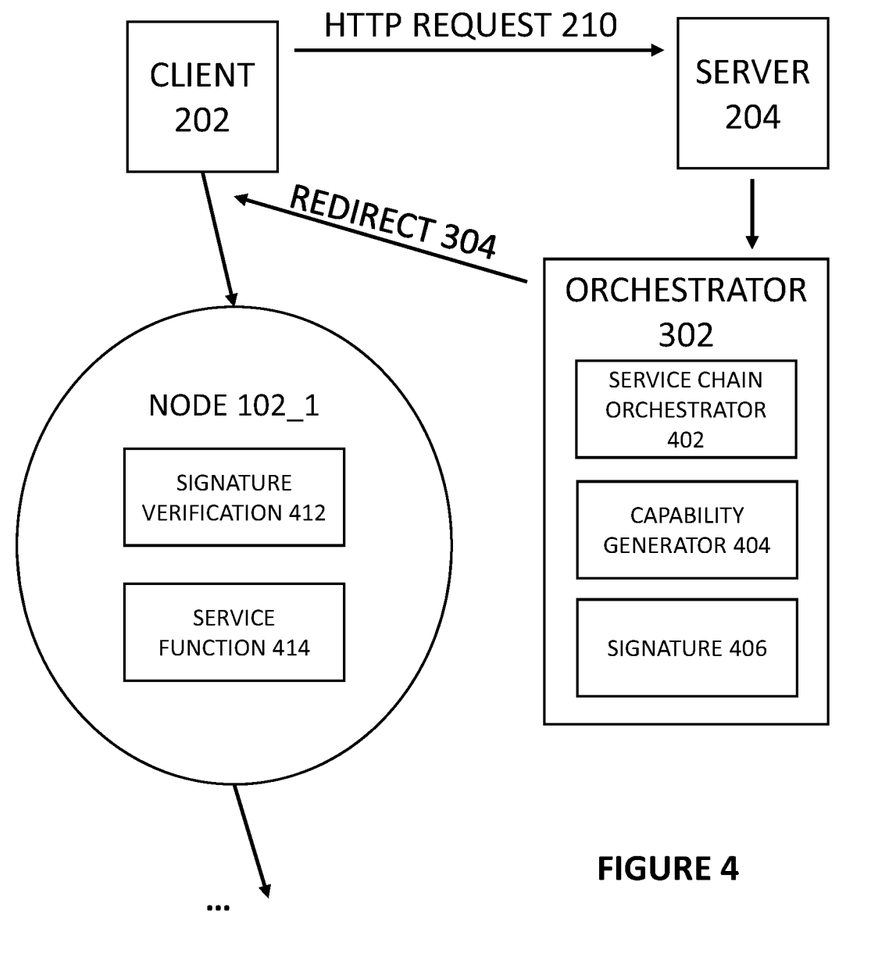
FIG. 4 illustrates functions of an exemplary orchestrator and an exemplary node in the service chain, according to some embodiments of the disclosure.

FIG. 4 illustrates functions of an exemplary orchestrator and an exemplary node in the service chain, according to some embodiments of the disclosure. The orchestrator 302 can include a service chain orchestrator part 402, a capability generator part 404, and a signature part 406. An exemplary service node 102_1 illustrates possible parts of any one of the nodes in the service chain processing traffic flow for delivering the content to the client 202. The node 102_1 can include signature verification part 412 and service function part 414.

The service chain orchestrator part 402 can determine the service chain for processing a request from a client for content and parameters associated with the service chain. For instance, the service chain orchestrator part 402 can determine an appropriate service chain based on various parameters associated with the request. The parameters can include one or more of the following: parameter(s) associated with the client, parameter(s) associated with the content being requested, parameter(s) associated with the content provider providing the content, and parameter(s) associated with a network delivering the content, etc.

For illustration, suppose the orchestrator 302 (O for orchestrator), e.g., service chain orchestrator part 302, determines/decides for the client 202 (C for client) to have traffic through a service chain of nodes P, Q, and R. Any one of these nodes can be the content provider for the content of interest. One or more of these nodes can provide a service function, such as caching, transcoding, ad insertion, etc., on the traffic flow associated with the delivery of the content of interest to C.

O 302 can create a redirect message 304 that can implement the service chain, and subsequently send the redirect message 304 to C 202. The redirect message 304 can redirect C to a first node of the service chain, e.g., P or node 102_1 (as illustrated by FIG. 4). To generate the redirect message, the capability generator part 404 can determine the capability that identifies the nodes of the service chain and the parameters. To implement the service chain with the redirect message 304, a URL of the redirect message 304 can encode the capability and redirect the request to the first node of the service chain.

For instance, e.g., the redirect URL requests C to fetch the content from P, whose domain name or Internet Protocol (IP) address is, say, "name-of-P.com". Furthermore, the URL of the redirect message 304 generated by the capability generator part 404 can include additional information/parameters encoded in that URL. When configured with the proper information, the URL of the redirect message 304 can serve as the capability that can be used to carry out the service chain. An exemplary URL for the redirect message 304 can include: //name-of-P.com/<M>/name-of-content/<S>. The parts of the exemplary URL thus includes one or more of the following: the locator for P "https://name-of-P.com", a message <M>, name of the content being requested, and a signature <S>.

The message <M> can include information/parameters for carrying out the service chain by the nodes of the service chain. For instance, the message can be intended for P, Q, and/or R. The message can be usable by P, Q, and/or R for directing actions to be performed by nodes P, Q, and/or R. The message <M> can include a service chain identifier (CID) identifying the service chain and/or locators for the nodes in the service chain. For instance, the message <m> can include a list of host addresses and port numbers for nodes of the service chain, e.g., address-of-Q, port-of-Q, address-of-R, and port-of-R. Note that the address/locator of P is already implied by the name-of-P.com in the URL of the redirect message 304. Also note that name-of-P.com could also be an IP address and a port number: 192.168.1.10:789. Accordingly, the nodes P, Q, and/or R, can use the message <M> to construct further URLs for directing the traffic flow to the next node in the service chain.

The signature <S> is the signature placed by O 302, and the signature can be verified by nodes of the service chain be used by P, Q and R, to verify <M> is genuine. The orchestrator 302 can include a signature part 406 for signing the capability generated by capability generator part 404. The capability can include the message <M> and the name of the content. Following the same example, the signature <S> can be created by the signature part 406 by taking the whole URL up to (but not including)/<S>, which can include the CID, the names/addresses of P, Q, and R, and the name of the content being requested, and computing a secure hash H of that (e.g., using the SHA256 algorithm) and encrypting H with O's secret key. The redirect message 304 would include the signature, and provides a signed capability for client 202 to use the service chain and obtain the content requested.

The resulting signature <S> can be used by nodes P, Q, and R to verify that the traffic flow through the service chain is genuine and authorized to request service functions to be applied to the traffic flow. For instance, signature verification part 412 of exemplary node 102_1 can verify the signature <S> to make sure the capability is genuine. All nodes P, Q, and R know O's public key, so that the nodes receiving the signed capability can take the URL and compute the hash H. The nodes can also decrypt <S> with O's public key. If the result is H, then the signature is valid and the URL will be trusted by P, Q, and R. These nodes can trust the capability encoded in the URL because they trust O 302 and the nodes can ascertain that that O must have signed the URL (with its private key). Once the signature is verified, for example, the service function part 414 of exemplary node 102_1 can apply an appropriate service function, e.g., based on the capability. The service function part 414 can also utilize the capability to direct the traffic flow to a next node according to the service chain identified by the capability. Other nodes in the service chain can include the signature verification part 412 and service function part 414 as illustrated by node 102_1.

The nodes such as the one illustrated by node 102_1 can use the capability to forward traffic using protocols other than HTTP/HTTPS. No matter the communication protocol, the nodes are configured to forward the capability for verification by downstream nodes in the service chain. Generally speaking, the nodes in the service chain are equipped with signature verification part 412 and service function part 414 for carrying out secure service chaining.

Besides the URL example described above for encoding the capability, variations can be implemented to achieve a similar function. The message <M> and signature <S> can be placed in the body of the messages that O 302 sends to C 202 and C 202 sends to P, instead of encoding the message <M> and the signature <S> in the URL of redirect message 304.

The capability may be encoded in the URL itself in the redirect message 304, or the capability can be communicated in another part of the redirect message 304, such as a header of the redirect message 304. The client 202 can treat and store the capability as a cookie. In some cases, capabilities may include an indirection to a place that supplies the information for the service chain. For instance, a capability can include an identifier of a network service header (NSH) or an identifier of a data element which has the information for the service chain. The identifier can point the client 202 to a different place to obtain the information for the service chain. In some cases, the capability can be encoded inside the Internet Engineering Task Force (IETF) SFC header or service chain selection (in place of utilizing HTTP/HTTPS to communicate the capability).

In some cases, the client 202 may receive a capability, e.g., a URL, in redirect message 304 that includes a locator for a first node of the service chain and an identifier for a further capability that the first node of the service chain then fetches (or automatically receives). The client 202 can use the locator for the first node to direct the traffic flow for requesting content to the first node of the service chain, and that identifier for the further capability enables the first node of the service chain to implement and carry out the service chain. That further capability to be received by the first node of the service chain can identify further nodes of the service chain downstream from the first node.

Capabilities may include a description of the service chain as a list of URL (prefixes), a list of IP addresses (or IP address/protocol/port triples). For instance, a capability may include addresses and port numbers of the nodes of the service chain. In another instance, a capability can include a service chain identifier identifying the service chain, and addresses and port numbers of the nodes of the service chain. In some cases, the capability being included or referenced in the redirect message (e.g., the HTTP redirect message) may further include other information besides IP addresses and port numbers, such as metadata for the service chain. Exemplary metadata includes subscriber identifier (not the client's or sender's IP address), and other header fields.

Capabilities can include a "valid from/valid until" field that prevents a capability from being reused at a later date/time without authorization. The capability can identify a time period during which the capability is valid within the service chain.

The redirect using a signed capability can additionally be interpreted by a client 204 as verification that a first node in the service chain is trusted by the content provider doing the redirect (e.g., if Netflix signs the redirect and the redirect points to Akamai, the user may conclude that Akamai is a trusted representative of Netflix).

Exemplary Methods

Figure 5:
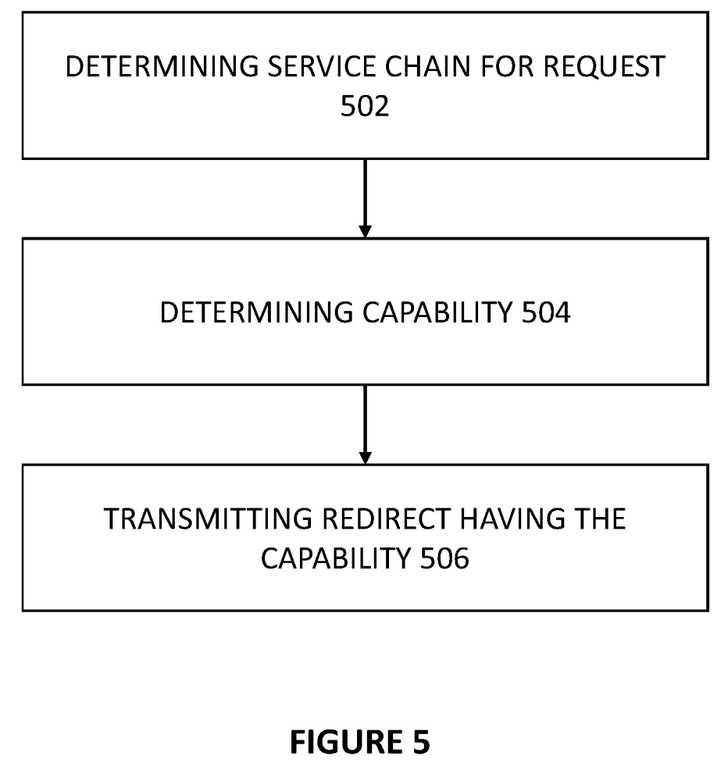
FIG. 5 depicts a flow diagram illustrating a method for implementing secure service chaining, according to some embodiments of the disclosure.

FIG. 5 depicts a flow diagram illustrating a method for implementing secure service chaining, according to some embodiments of the disclosure. In 502, an orchestrator can determine a service chain for processing a request from a client for content. In 504, the orchestrator can determine a capability identifying nodes of the service chain. In 506, the orchestrator can transmit, to the client, a redirect message having the capability, wherein the redirect message redirects the request to a first node of the service chain. Any one or more parts shown for orchestrator 302 in FIG. 3 can implement functionalities associated with implementing secure service chaining.

Figure 6:
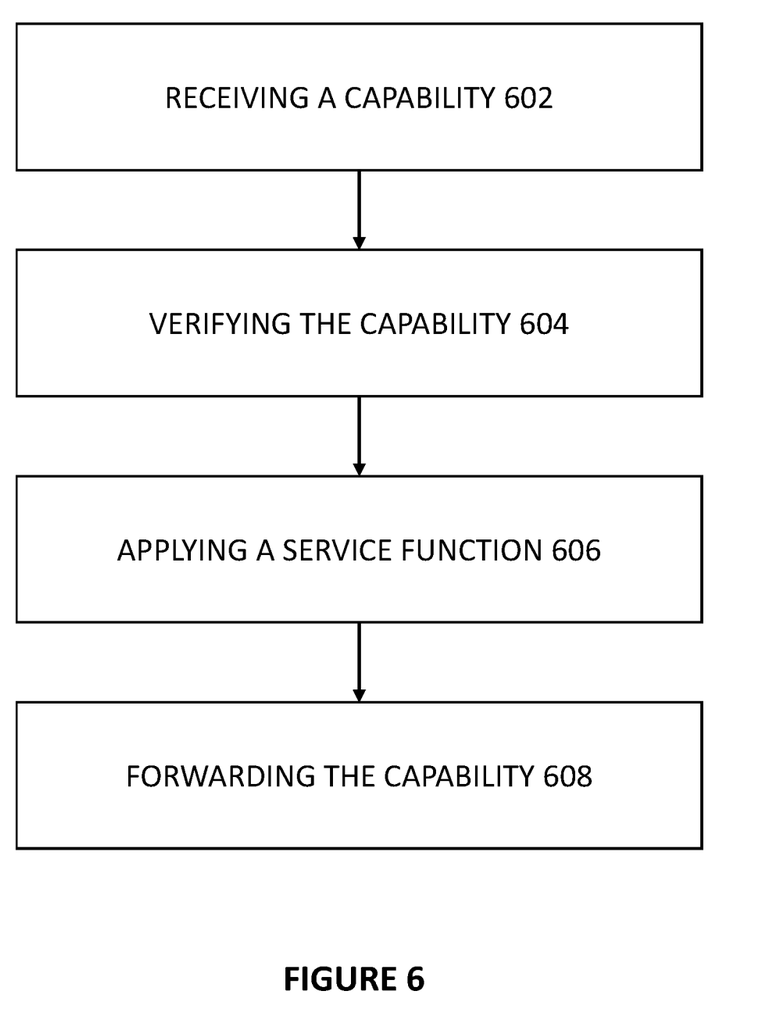
FIG. 6 depicts a flow diagram illustrating a method for carrying out secure service chaining, according to some embodiments of the disclosure.

FIG. 6 depicts a flow diagram illustrating a method for carrying out secure service chaining, according to some embodiments of the disclosure. In 602, a node in the service chain can receive a capability associated with a traffic flow. In 604, the node can verify the capability. For instance, a cryptographic signature can be used to verify the authenticity of the capability. In 606, the node can apply a service function to the traffic flow, e.g., upon verifying that the signature is genuine. The service function to be applied can be determined based on the parameters in the capability. In 606, the node can forward the capability and the traffic flow to a next node in the service chain, as specified by parameters in the capability. Any one or more nodes 102_1, 102_2, . . . 102_N in FIG. 3 can implement functionalities associated with carrying out secure service chaining.

Exemplary System

Figure 7:
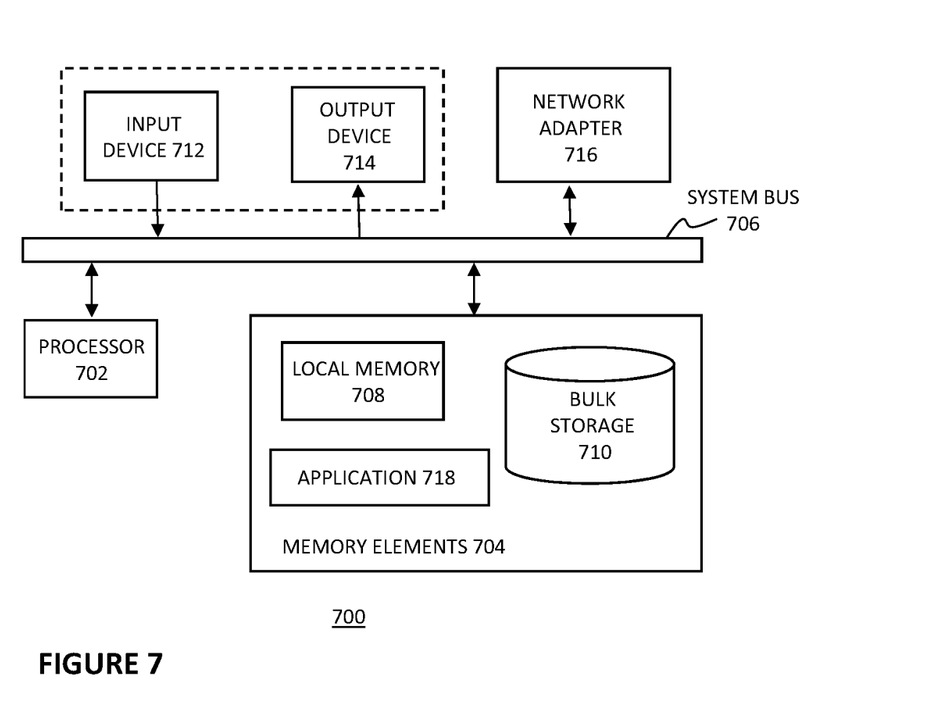
FIG. 7 depicts a block diagram illustrating an exemplary data processing system that may be used to implement the functionality of secure service chaining, according to some embodiments of the disclosure.

FIG. 7 depicts a block diagram illustrating an exemplary data processing system 700 (sometimes referred herein as a "node") that may be used to implement the functionality associated with secure service chaining, according to some embodiments of the disclosure. For instance, components seen in FIGS. 3 and 4, may have one or more of the components of the data processing system 700 or their functionalities may be implemented with one or more components of data processing system 700.

As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this Specification.

The memory elements 704 may include one or more physical memory devices such as, for example, local memory 708 and one or more bulk storage devices 710. The local memory may refer to random access memory or other non-persistent memory device(s) generally used during actual execution of the program code. A bulk storage device may be implemented as a hard drive or other persistent data storage device. The data processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Persons skilled in the art will recognize that while the elements 702-718 are shown in FIG. 7 as separate elements, in other embodiments their functionality could be implemented in lesser number of individual elements or distributed over a larger number of components.

Examples

Example 1 is a method for service chaining, the method comprising: determining a service chain for processing a request from a client for content; determining a capability identifying nodes of the service chain; and transmitting, to the client, a redirect message having the capability, wherein the redirect message redirects the request to a first node of the service chain.

In Example 2, the method in Example 1 can optionally include: signing the capability to generate a signature to be verified by nodes of the service chain, wherein the redirect message further includes the signature.

In Example 3, the method in Example 1 or 2 can optionally include the redirect message having the capability comprising a message to be processed by the service chain, name of the content, and a signature of the message and the name of the content.

In Example 4, the method in any one of Examples 1-3 can optionally include the capability of the redirect message comprising addresses and port numbers of the nodes of the service chain.

In Example 5, the method in any one of Examples 1-4 can optionally include the capability of the redirect message comprising a service chain identifier identifying the service chain, and addresses and port numbers of the nodes of the service chain.

In Example 6, the method in any one of Examples 1-5 can optionally include the capability of the redirect message comprising an identifier for a further capability identifying further node(s) of the service chain to be provided to the first node of the service chain.

In Example 7, the method in any one of Examples 1-6 can optionally include the capability identifying a time period during which the capability is valid within the service chain.

Example 8 is an orchestrator for service chaining, the orchestrator comprising: at least one memory element having instructions stored thereon; and at least one processor coupled to the at least one memory element and configured to execute the instructions to cause the orchestrator to perform operations including: determining a service chain for processing a request from a client for content; determining a capability identifying nodes of the service chain; and transmitting, to the client, a redirect message having the capability, wherein the redirect message redirects the request to a first node of the service chain.

In Example 9, the orchestrator of Example 8 can optionally include the operations further including: signing the capability to generate a signature to be verified by nodes of the service chain, wherein the redirect message further includes the signature.

In Example 10, the orchestrator of Example 8 or 9 can optionally include the redirect message having the capability comprising a message to be processed by the service chain, name of the content, and a signature of the message and the name of the content.

In Example 11, the orchestrator of any one of Examples 8-10 can optionally include the capability of the redirect message comprising addresses and port numbers of the nodes of the service chain.

In Example 12, the orchestrator of any one of Examples 8-11 can optionally include the capability of the redirect message comprising a service chain identifier identifying the service chain, and addresses and port numbers of the nodes of the service chain.

In Example 13, the orchestrator of any one of Examples 8-12 can optionally include the capability of the redirect message comprising an identifier for a further capability identifying further node(s) of the service chain to be provided to the first node of the service chain.

In Example 14, the orchestrator of any one of Examples 8-13 can optionally include the capability identifying a time period during which the capability is valid within the service chain.

Example 15 has one or more computer-readable non-transitory media comprising one or more instructions for service chaining, that when executed on a processor configure the processor to: determine a service chain for processing a request from a client for content; determine a capability identifying nodes of the service chain; and transmit, to the client, a redirect message having the capability, wherein the redirect message redirects the request to a first node of the service chain.

In Example 16, the one or more computer-readable non-transitory media in Example 15 can optionally include wherein the instructions, that when executed on the processor, further configuring the processor to: sign the capability to generate a signature to be verified by nodes of the service chain, wherein the redirect message further includes the signature.

In Example 17, the one or more computer-readable non-transitory media of Example 15 or 16 can optionally include the redirect message having the capability comprising a message to be processed by the service chain, name of the content, and a signature of the message and the name of the content.

In Example 18, the one or more computer-readable non-transitory media of any one of Examples 15-17 can optionally include the capability of the redirect message comprising one or more of the following: (1) a service chain identifier identifying the service chain, and (2) addresses and port numbers of the nodes of the service chain.

In Example 19, the one or more computer-readable non-transitory media of any one of Examples 15-18 can optionally include the capability of the redirect message comprising an identifier for a further capability identifying further node(s) of the service chain to be provided to the first node of the service chain.

In Example 20, the one or more computer-readable non-transitory media of any one of Examples 15-19 can optionally include the capability identifying a time period during which the capability is valid within the service chain.

Example 21 is an apparatus comprising means for implementing and/or carrying out the methods in any one of Examples 1-7.

Additional Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise WAN deployment, The architecture of the present disclosure may include a configuration capable of transmission control protocol/internet protocol (TCP/IP) communications for the transmission and/or reception of packets in a network.

As used herein in this Specification, the term 'node' or 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the NSH features/operations thereof. This may be inclusive of appropriate algorithms and communication protocols that allow for the effective exchange of data or information.

In one implementation, various nodes or network elements may include software to achieve (or to foster) the functions discussed herein for providing service chaining related features/functions where the software is executed on one or more processors to carry out the functions. This could include the implementation of instances of parts seen in FIG. 4, and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the service chaining related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the service chaining related features, as outlined herein. Additionally, each of these devices may include a processor that can execute software or an algorithm to perform the NSH-related and load balancing-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of service chaining, as potentially applied to a myriad of other architectures.

It is also important to note that the various steps described herein illustrate only some of the possible scenarios that may be executed by, or within, the network elements described herein (e.g., entities of FIG. 4). Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network elements described herein in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for service chaining, the method comprising:
   determining a service chain for processing a request from a client for content;
   determining a capability identifying nodes of the service chain; and
   transmitting, to the client, a redirect message having the capability,
   wherein,
      the redirect message includes a message and a name of the content,
      the redirect message redirects the request to a first node of the service chain, and
      the capability of the redirect message includes a service chain identifier identifying the service chain.

2. The method of claim 1, further comprising:
   signing the capability to generate a signature to be verified by nodes of the service chain, wherein the redirect message further includes the signature.

3. The method of claim 1, wherein the redirect message includes a signature of the message and the name of the content.

4. The method of claim 1, wherein the capability of the redirect message comprises addresses and port numbers of the nodes of the service chain.

5. The method of claim 1, wherein the capability of the redirect message comprises an identifier for a further capability identifying further node(s) of the service chain to be provided to the first node of the service chain.

6. The method of claim 1, wherein the capability identifies a time period during which the capability is valid within the service chain.

7. An orchestrator for service chaining, the orchestrator comprising:
   at least one memory element having instructions stored thereon; and
   at least one processor coupled to the at least one memory element and configured to execute the instructions to cause the orchestrator to perform operations including:
      determining a service chain for processing a request from a client for content;
      determining a capability identifying nodes of the service chain; and
      transmitting, to the client, a redirect message having the capability,
   wherein,
      the redirect message includes a message and a name of the content,
      the redirect message redirects the request to a first node of the service chain, and
      the capability of the redirect message includes a service chain identifier identifying the service chain.

8. The orchestrator of claim 7, wherein the operations further include:
   signing the capability to generate a signature to be verified by nodes of the service chain, wherein the redirect message further includes the signature.

9. The orchestrator of claim 7, wherein the redirect message includes a signature of the message and the name of the content.

10. The orchestrator of claim 7, wherein the capability of the redirect message comprises addresses and port numbers of the nodes of the service chain.

11. The orchestrator of claim 7, wherein the capability of the redirect message comprises an identifier for a further capability identifying further node(s) of the service chain to be provided to the first node of the service chain.

12. The orchestrator of claim 7, wherein the capability identifies a time period during which the capability is valid within the service chain.

13. One or more computer-readable non-transitory media comprising one or more instructions for service chaining, that when executed on a processor configure the processor to:
   determine a service chain for processing a request from a client for content;
   determine a capability identifying nodes of the service chain; and
   transmit, to the client, a redirect message having the capability,
   wherein,
      the redirect message includes a message and a name of the content,
      the redirect message redirects the request to a first node of the service chain, and
      the capability of the redirect message includes a service chain identifier identifying the service chain.

14. The one or more computer-readable non-transitory media of claim 13, wherein the instructions, that when executed on the processor, further configure the processor to:
   sign the capability to generate a signature to be verified by nodes of the service chain, wherein the redirect message further includes the signature.

15. The one or more computer-readable non-transitory media of claim 13, wherein the redirect message includes a signature of the message and the name of the content.

16. The one or more computer-readable non-transitory media of claim 13, wherein the capability of the redirect message includes addresses and port numbers of the nodes of the service chain.

17. The one or more computer-readable non-transitory media of claim 13, wherein the capability of the redirect message comprises an identifier for a further capability identifying further node(s) of the service chain to be provided to the first node of the service chain.

18. The one or more computer-readable non-transitory media of claim 13, wherein the capability identifies a time period during which the capability is valid within the service chain.

\* \* \* \* \*